(12) United States Patent
Visser et al.

(10) Patent No.: US 10,933,378 B2
(45) Date of Patent: Mar. 2, 2021

(54) HOLLOW FIBRE MEMBRANE CARTRIDGE AND MODULE FOR THE SEPARATION OF FLUIDS

(71) Applicant: Evonik Fibres GmbH, Schörfling am Attersee (AT)

(72) Inventors: Tymen Visser, Beek (NL); Steven Pedersen, Collingwood (CA)

(73) Assignee: Evonik Fibres GmbH, Schörfling am Attersee (AT)

(*) Notice: Subject to any disclaimer, the term of this patent is extended or adjusted under 35 U.S.C. 154(b) by 426 days.

(21) Appl. No.: 15/576,316

(22) PCT Filed: Jun. 8, 2016

(86) PCT No.: PCT/EP2016/063030
§ 371 (c)(1),
(2) Date: Nov. 22, 2017

(87) PCT Pub. No.: WO2016/198450
PCT Pub. Date: Dec. 15, 2016

(65) Prior Publication Data
US 2018/0169584 A1    Jun. 21, 2018

(30) Foreign Application Priority Data
Jun. 9, 2015    (EP) .................................... 15171206

(51) Int. Cl.
*B01D 63/02*    (2006.01)
*B01D 63/06*    (2006.01)
*B01D 53/22*    (2006.01)

(52) U.S. Cl.
CPC .......... *B01D 63/021* (2013.01); *B01D 53/22* (2013.01); *B01D 63/02* (2013.01); *B01D 63/06* (2013.01); *B01D 2313/12* (2013.01); *B01D 2313/44* (2013.01); *B01D 2317/022* (2013.01)

(58) Field of Classification Search
CPC ...... B01D 63/02; B01D 63/021; B01D 63/06; B01D 53/22; B01D 53/228; B01D 2313/12; B01D 2313/44; B01D 2317/022
See application file for complete search history.

(56) References Cited

U.S. PATENT DOCUMENTS

| | | | |
|---|---|---|---|
| 3,422,008 | A | 1/1969 | Mahon |
| 3,455,460 | A | 7/1969 | Mahon et al. |
| 3,475,331 | A | 10/1969 | McLain |
| 4,207,192 | A | 6/1980 | Coplan et al. |
| 4,210,536 | A | 7/1980 | Coplan et al. |

(Continued)

FOREIGN PATENT DOCUMENTS

| | | |
|---|---|---|
| CN | 103691323 A | 4/2014 |
| EP | 0627254 B1 | 12/1994 |

OTHER PUBLICATIONS

International Search Report, International Application No. PCT/EP2016/063030, dated Sep. 13, 2016.

(Continued)

*Primary Examiner* — John Kim
(74) *Attorney, Agent, or Firm* — Michael Best & Friedrich LLP

(57) ABSTRACT

The present invention relates to novel cartridges and modules for separation of fluid mixtures, especially for gas separation, to a process for production thereof and to a method of use thereof.

25 Claims, 2 Drawing Sheets

(56) References Cited

U.S. PATENT DOCUMENTS

| | | | |
|---|---|---|---|
| 4,220,489 A | 9/1980 | Coplan et al. | |
| 4,430,219 A | 2/1984 | Kuzumoto et al. | |
| 4,631,128 A | 12/1986 | Coplan et al. | |
| 4,715,953 A | 12/1987 | Leonard | |
| 4,865,736 A | 9/1989 | Coplan | |
| 4,881,955 A | 11/1989 | Bikson et al. | |
| 5,026,479 A | 6/1991 | Bikson | |
| 5,084,073 A | 1/1992 | Prasad | |
| 5,160,042 A | 11/1992 | Bikson et al. | |
| 5,299,749 A | 4/1994 | Thorogood et al. | |
| 5,411,662 A | 5/1995 | Nicolas, Jr. | |
| 5,470,469 A | 11/1995 | Eckman | |
| 5,702,601 A | 12/1997 | Bikson et al. | |
| 5,837,032 A | 11/1998 | Moll et al. | |
| 5,837,033 A | 11/1998 | Giglio et al. | |
| 5,897,729 A | 4/1999 | Bikson et al. | |
| 6,224,767 B1 * | 5/2001 | Fujiwara | B01D 53/22 210/323.1 |
| 7,410,580 B2 | 8/2008 | Koch et al. | |
| 7,704,394 B2 | 4/2010 | Hashimoto et al. | |
| 7,998,254 B2 | 8/2011 | Burban et al. | |
| 8,747,980 B2 | 6/2014 | Bikson et al. | |
| 8,778,062 B1 | 7/2014 | Snow, Jr. | |
| 2002/0162451 A1 | 11/2002 | Bikson | |
| 2003/0154856 A1 | 8/2003 | Anderson | |
| 2012/0123079 A1 * | 5/2012 | Ungerank | B01D 67/0009 528/67 |

OTHER PUBLICATIONS

Written Opinion, International Application No. PCT/EP2016/063030, dated Sep. 13, 2016.

* cited by examiner

HOLLOW FIBRE MEMBRANE CARTRIDGE AND MODULE FOR THE SEPARATION OF FLUIDS

The present invention provides novel cartridges and modules for separation of fluid mixtures, especially for gas separation, a process for production thereof and a method of use thereof.

Membranes are used industrially in many sectors for separation of gas, liquid and gas/liquid mixtures, each referred to hereinafter as fluid mixtures. The membranes are generally used installed in modules or cartridges. Modules differ from cartridges in that they constitute a complete separation unit including the housing. Cartridges, in contrast, are used in separate housings, preferably in a housing installed into the separation system in a fixed manner. Cartridges thus have the advantage that lower costs arise on exchange thereof than in the case of modules, since the costly pressure-resistant housing need not be replaced as well.

While generally small-volume cartridges or modules are used in the sector of biogas processing, large-volume cartridges or modules are required in the sector of purification of natural gas, for example, to be able to cope with large volumes of gas. In addition, this field of use requires cartridges and modules which can be used at relatively high feed gas pressures, preferably of 30 to 100 bar.

For example, UOP sells Separex™ gas separation systems for purification of natural gas. These are cartridges in which flat-sheet membranes are wound around a central permeate collecting tube. A plurality of such cartridges are connected in series in a housing installed in a fixed manner in the gas separation system. The membranes consist of cellulose acetate. The UOP technology has the drawback that the cartridges have a relatively short lifetime and, according to the use conditions, may already have to be replaced after a period of months. Moreover, the capacity of the individual cartridges is unsatisfactory and there is a need for improved systems.

As well as the flat-sheet membrane modules which—as described above—are already being used commercially, there have been a multitude of attempts to produce cartridges or modules from hollow-fibre membranes as well. Examples of these can be found in U.S. Pat. Nos. 3,422,008, 3,455,460, 3,475,331, 4,207,192, 4,210,536, 4,220,489, 4,430,219, 4,631,128, 4,715,953, 4,865,736, 4,881,955, 5,026,479, 5,084,073, 5,160,042, 5,299,749, 5,407,469, 5,411,662, 5,702,601, 5,837,032, 5,837,033, 5,897,729, 7,410,580, 7,998,254, US 2002/0162451, U.S. Pat. Nos. 8,747,980, 8,778,062, US 2003/0154856, EP 0 627 254 and CN 103691323. However, it has not yet been possible to develop cartridges or modules made from hollow-fibre membranes that cope with a high fluid volume at high pressures and two or more of which can be connected to one another in one housing such that they are suitable, for example, as a replacement for flat-sheet membrane cartridges in the UOP systems.

There is thus still a need for new cartridges or modules for separation of fluid mixtures, especially for gas separation, with which large volumes can be separated in an efficient manner and which can replace the cartridges used to date in existing systems, such that there is no need to construct new systems.

The present application thus provides novel cartridges and modules for separation of fluid mixtures, especially for gas separation, and a process for production thereof and a method for use thereof, which have the disadvantages of the prior art systems at most only to a reduced degree, if at all.

The novel cartridges should especially be suitable for replacing conventional cartridges in existing systems.

In a further specific object, the novel cartridges or modules are to have advantages compared to the prior art systems, in that they have a longer operating time and/or are producible at lower cost and/or have better separation performance, preferably based on the fluid volume per hour and/or purity.

Further objects not referred to explicitly are apparent from the overall context of the present description, examples, claims and drawings.

The inventors have now found that it is possible to achieve the abovementioned objects by, in a cartridge or a module, disposing a multitude of hollow-fibre membranes around a central permeate collecting tube and configuring the cartridge or the module in such a way that the fluid mixture to be separated flows toward the hollow fibres from the outside. In this case, a major proportion of the more rapidly permeating fluid and possibly a minor proportion of the more slowly permeating fluid in the fluid mixture permeates through the hollow-fibre membranes and forms the permeate or the permeate stream in the hollow core thereof. By virtue of a suitable configuration of the cartridge according to Claim 1 or one of the claims dependent thereon, the latter in turn is fed to the permeate collecting tube and thence discharged from the separation plant. The cartridge of the invention is configured in such a way that the fluid mixture to be separated is conducted past the hollow-fibre membranes in longitudinal direction of the cartridge, in the course of which it is enriched with the more slowly permeating fluid, as described above, forming the retentate. The cartridges of the invention according to Claim 1 or a claim dependent thereon are configured in such a way that the retentate can be removed from the cartridge and either fed to a further cartridge or removed from the housing of the module.

The present invention has succeeded for the first time in producing cartridges from hollow-fibre membranes that are connected to one another via the permeate collecting tube and a plurality of which can also, by virtue of the retentate conduction, be series-connected in a module in such a way that they can be used as replacement cartridges in the UOP systems.

By virtue of the supply of the fluid mixture to be separated to the outside of the hollow-fibre membranes, it has additionally been possible to provide cartridges which withstand very high operating pressures. This is significant especially in the case of separation of gas mixtures. In addition, the cartridges of the invention have the advantage that they can be produced in large volumes, i.e. high length and high diameter, and fulfil the corresponding requirements.

A further advantage of the cartridges of the invention over the systems used commercially is considered to be that it has been possible through the use of the hollow-fibre membranes to accommodate a larger membrane area in the same cartridge volume. The cartridges of the invention are thus able to have better separation performance than the prior art systems.

The systems of the invention additionally have the advantage that, for different hollow-fibre membranes, they are obtainable with different diameters and/or made from different materials, and are thus usable flexibly. In addition, the cartridges are variable in terms of diameter and geometry and can thus be matched to various requirements of existing separation plants.

Further advantages of the present invention that are not stated explicitly will become apparent from the description, the examples, the claims and drawings.

The present invention thus provides cartridges according to Claim 1, modules according to Claim 9, a process for producing the cartridges of the invention according to Claim 11 and a method for separating fluids, especially for gas separation, using the cartridges of the invention according to Claim 14. Preferred configuration forms are claimed in the dependent claims and elucidated in detail in the description which follows.

The present invention will now be described in detail. First some important terms will be defined.

The quotient of the permeances of the fluids to be separated, especially of the individual gases, determines the selectivity of a membrane with regard to separating the two fluids and thus indicates how efficiently the membrane is capable of separating a fluid mixture with regard to the two components.

The term permeate applies to the entire stream generated on the low-pressure side of the membrane, membrane modules or membrane separation step.

Permeate fluid or permeate gas refers to the component(s) which the membrane, the membrane module or the membrane separation step each enrich(es) in the permeate stream compared with the respective entry stream.

Retentate refers to the entire stream generated on the high-pressure side of the membrane, membrane modules or membrane separation step and not passing through the membrane.

Retentate fluid or retentate gas refers to the component(s) which the membrane, the membrane module or the membrane separation step each enrich(es) in the retentate stream compared with the respective entry stream.

Fluid mixture to be separated, especially gas mixture to be separated, refers to a fluid mixture, preferably a gas mixture, of at least two fluids, preferably two gases, or a stream of this fluid mixture, preferably gas mixture, which is to be separated by means of the method of the invention or the device of the invention.

The hereinbelow described preferred and specific embodiments of the method according to the present invention and also the preferred and particularly suitable designs and also the drawings and descriptions of drawings will now be used to provide a merely illustrative further elucidation of the invention; that is, the invention is not limited to these exemplary embodiments and uses or to the particular combinations of features within individual exemplary embodiments.

Figure 1:
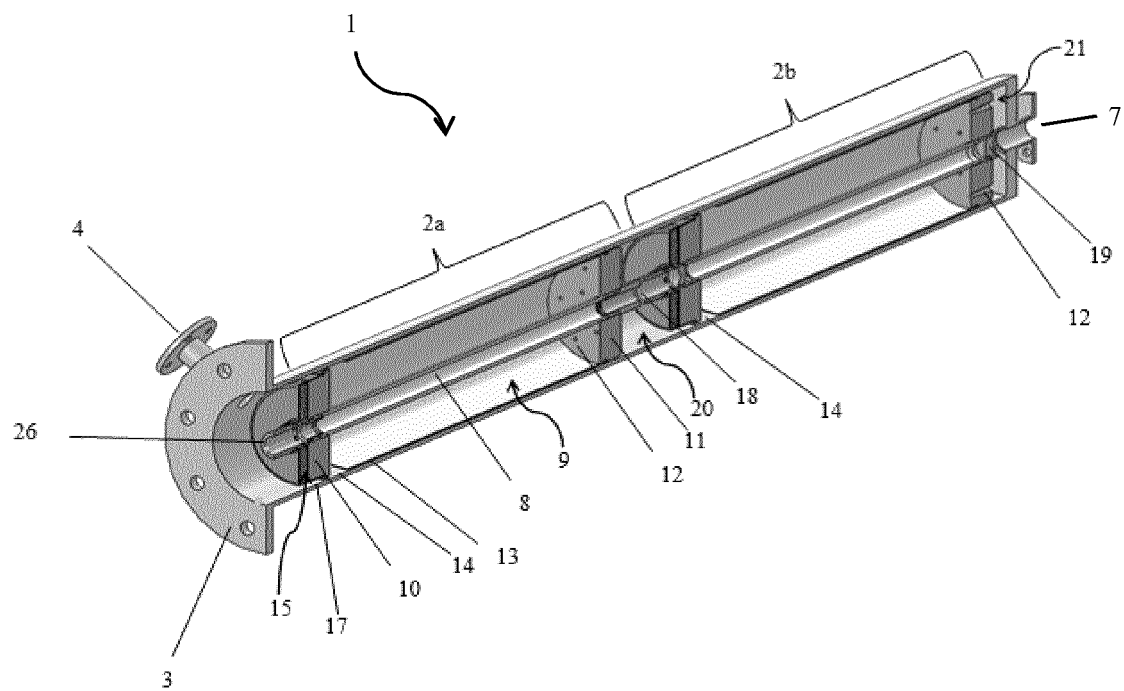
FIG. 1 shows, by way of example, a longitudinal section through a fluid separation module of the invention with two cartridges of the invention inserted.

Individual features indicated and/or depicted in connection with concrete exemplary embodiments are not restricted to these exemplary embodiments or to the combination with the other features of these exemplary embodiments, but can be combined where technically possible with any other versions even though these are not separately discussed in the present document.

Identical reference signs in the individual figures and illustrations of the drawings designate identical or similar components or components acting in an identical or similar manner. The depictions in the drawing also illustrate those features without reference signs, irrespective of whether such features are subsequently described or not. On the other hand, features which are included in the present description but are not visible or depicted in the drawing are also readily apparent to a person skilled in the art.

Figure 2:
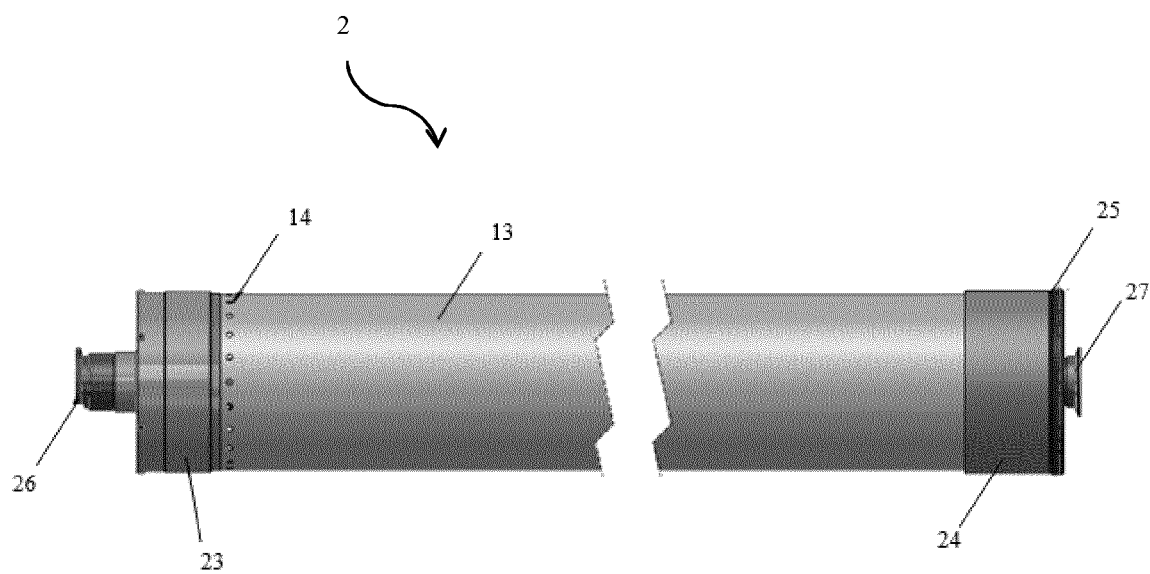
FIG. 2 shows the outside view of a cartridge of the invention.
Figure 3:
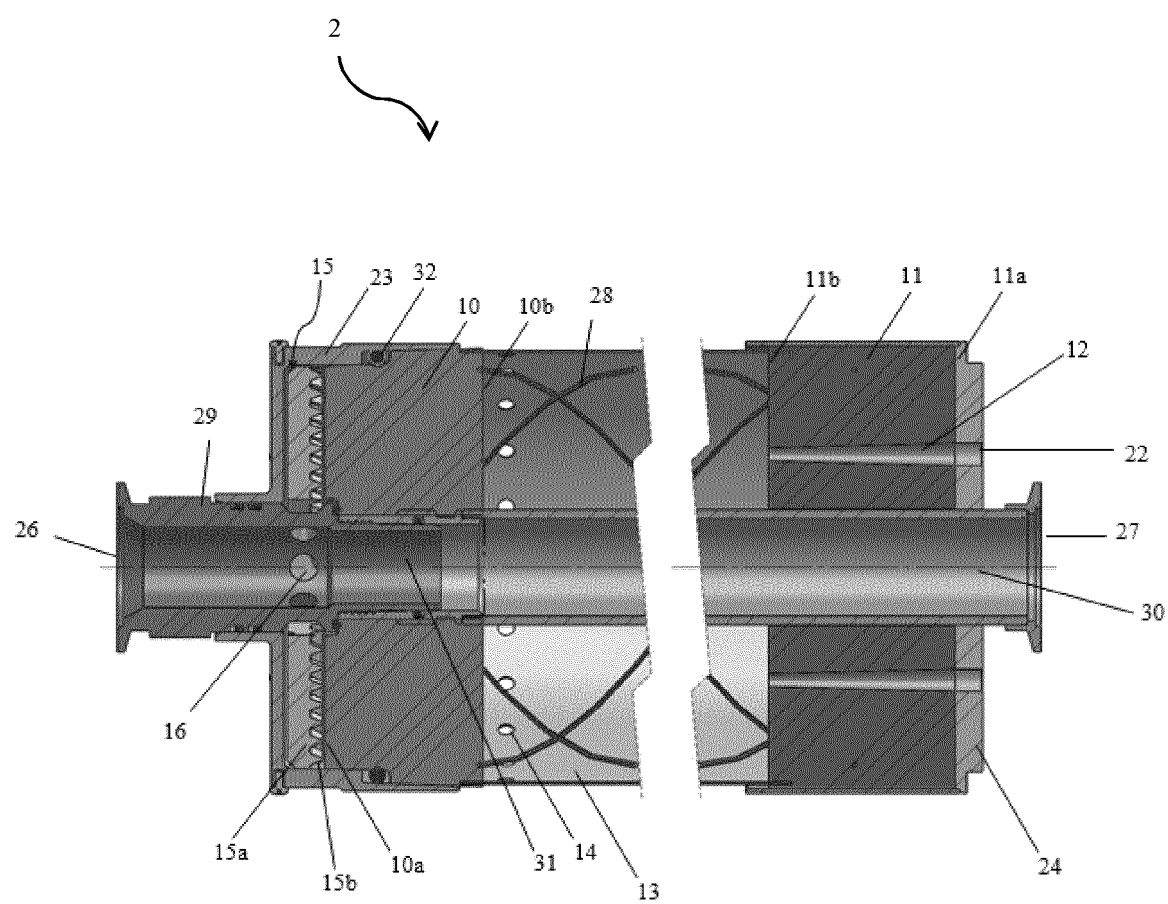
FIG. 3 shows a longitudinal section of a cartridge of the invention.

A preferred embodiment of the present device of the invention is shown in FIGS. 1 to 3. FIG. 1 shows a longitudinal section of a separation module (1) of the invention. FIG. 2 shows an outside view of a cartridge (2) of the invention, whereas FIG. 3 shows a longitudinal section of a cartridge (2) of the invention.

With reference to FIG. 1, the separation module (1) of the invention comprises a housing (3) in which there are, for example, two cartridges (2a) and (2b) of the invention. The fluid mixture to be separated passes through the fluid inlet of the module (4) into the interior of the housing (3). Subsequently, the fluid mixture is routed through a gap (17) between the end cap EK1 (23) of the first cartridge (2a) and the inner wall of the module housing (3) to the fluid entry orifice (14) of cartridge (2a). The cartridge (2a) consists of a permeate collecting tube PSR (8) disposed in a longitudinal axis, around which there are disposed a bundle of hollow-fibre membranes (28) (see FIG. 3; not shown in FIG. 1 for the sake of clarity). The hollow fibres have a front end HFE1 and a rear end HFE2. The front end HFE1 is embedded in the first tube sheet VA1 (10) in such a way that the cores of the hollow fibres are open, meaning that the permeate can exit the hollow fibres at the outer end face of VA1 (10a) (see FIG. 3). The rear end of the hollow fibres HFE2 is embedded in a second tube sheet VA2 (11), in such a way that the hollow-fibre cores are closed, meaning that no permeate can exit the hollow fibres on this side (see FIG. 3). The arrangement composed of PSR (8) and hollow-fibre membrane bundle (28) is surrounded completely between VA1 (10) and VA2 (11) by an impermeable barrier (13), apart from the fluid entry orifice (14) (see FIGS. 1 and 2). The fluid mixture to be separated is thus forced through the fluid entry orifice (14) into the interspace between PSR (8) and the impermeable barrier (13). It comes into contact there with the outer shell of the hollow-fibre membranes.

As a result of a pressure differential between the interspace (9) (high-pressure region) and the core of the hollow-fibre membranes (low-pressure region), a relatively large amount of the more readily permeating fluid in the fluid mixture to be separated, possibly together with a smaller proportion of the less easily permeating fluid, permeates through the hollow-fibre membrane and forms the permeate in the core of the hollow-fibre membrane. The more readily permeating fluid is thus enriched in the permeate, as compared with the fluid mixture to be separated. The permeate is then routed through the core of the hollow-fibre membranes, through VA1 (10) into a cavity (EK1 cavity (15)) which is formed between the inner surface of EK1 (23) and the outer end face of VA1 (10a). The EK1 cavity (15) is additionally in fluid communication with the PSR (8), meaning that the permeate can pass out of the EK1 cavity (15) through orifices (16) into the interior of the PSR (8) (see FIG. 3). In turn, the permeate of the first cartridge, together with that of the further cartridges in the same housing (3), is discharged thence from the module through the permeate outlet of the module (6) (not shown in the figures).

In the EK1 cavity (15), there is preferably at least one support element (15a). With the aid of a support element (15a), it is possible to optimize the distribution of the permeate gas in the direction of the orifices (16) of the permeate collecting tube (8). In the case of a suitable design, support element (15a) can additionally contribute to improving the mechanical stability of the cartridge, especially at high pressures of the fluid mixture to be separated. In addition, the use of a suitable support element (15a) additionally regulates the pressure drop resulting from expansion of the permeate fluids out of the cores of the hollow-fibre membranes into the EK1 cavity (15). In order to route the permeate out of the cores of the hollow-fibre membranes in the direction of the orifices (16), the support element (15a) in the simplest case may be configured such that it fills the major portion of the EK1 cavity (15) and forms a gap between the side of the support element (15a) facing VA1 (10) and VA1 (10), through which the permeate gas is routed. Preferably, however, the support element (15a) is manufactured from a porous material and/or has internal and/or external channels, in which case the pores or channels are preferably configured in such a way that the permeate gas is steered in the right direction. In order to have a particularly positive effect on the distribution of the permeate gas in the direction of the orifices (16), the support element (15a) more preferably has an external shape suitable for routing the permeate from the exit orifices of the hollow-fibre membranes toward the orifices (16). An illustrative embodiment of this can be seen in FIG. 3. The EK1 cavity (15) in FIG. 3 is filled with a support element (15a). The support element (15a) has, on the side facing VA1 (10), a profile (15b), or more specifically channels (15b), through which the permeate from the cores of the hollow-fibre membranes is routed to the orifice (16). Likewise preferably, it is possible to install a filter element (not shown in FIG. 3), for example a woven or nonwoven material or a sintered metal plate, between a support element (15a), with or without profile (15b), and VA1 (10), which additionally promotes routing of the permeate to the orifice (16). Analogous technical configuration forms, for example designing the support element (15) as a part integrated into the front end cap (23) in a fixed manner and not as an isolated part, which have the same functionality are easily discovered by a person skilled in the art.

Preferably, the support element (15a) consists of corrosion-resistant materials, more preferably of stainless steel. Most preferably, the support element (15a) consists of the same material as the end cap (23). Likewise more preferably, the support element (15a), as indicated above, is an integral constituent of the permeate cap (23).

Particularly preferred filter elements consist of corrosion-resistant materials such as stainless steel, or else of bronze, brass or aluminium.

Most preferably, the filter element has pores or channels having a smaller diameter at least by a factor of 5 to 10 than the internal diameter of the hollow-fibre membranes, so that the permeate can flow freely and is not blocked.

As a result of the abovementioned permeation of the more readily permeating fluid into the core of the hollow-fibre membranes, the more slowly permeating fluid becomes enriched in the interspace (9). The retentate forms therein from the fluid mixture to be separated, and is routed in the interspace (9) in the direction of VA2 (11) and becomes ever more enriched with the less easily permeating fluid in this period. VA2 (11) is surrounded by the second end cap EK2 (24) (see FIGS. 2 and 3, not shown in FIG. 1). The cartridge of the invention is, in a region between the fluid entry orifices (14) and the retentate outlet orifices (12), connected in a fluid-tight manner at at least one site to the inner wall of the module housing (3), in order to separate the fluid mixture (feed stream) to be separated from the retentate stream that exits the cartridge. The fluid tight connection can be effected, for example, by means of a seal disposed between the inner wall of the module housing (3) and the impermeable barrier (13) or between the inner wall of the module housing (3) and EK2 (24) or between the inner wall of the module housing (3) and VA2 (11). Preferably, EK2 (24) is in connected with the inner wall of the module housing (3) via a seal (25). The seal, as already indicated, prevents the fluid mixture to be separated from mixing with the retentate of the first cartridge (2a). This is because the retentate flows through retentate outlets (12) and (22) (see FIGS. 1 and 3) present in VA2 (11) and in EK2 (24) out of the first cartridge (2a) and into the interior (20) of the housing (3) present between cartridge (2a) and cartridge (2b).

The retentate of the first cartridge (2a) is concentrated further in the second cartridge (2b) which works and is constructed analogously to the first cartridge (2a), meaning that it forms the fluid mixture to be separated therein.

The PSR (8) of the second cartridge (2b) is connected to the PSR (8) of the first cartridge at the connection site (18), so as to give a common PSR which extends from the front end PSRE1 (26) of the permeate collecting tube (2a) as far as the rear end PSRE2 (27) of the PSR of cartridge (2b). At the end of the PSR (8) is the fluid barrier (19) which is preferably disposed in the region of the VA2 (11) of the rearmost cartridge in the chain of cartridges and can be produced from any desired fluid-tight, especially gas-tight, and sufficiently pressure-resistant material. "Sufficiently pressure-resistant" means that the permeate barrier (19) has to withstand the pressure differential between the permeate pressure in the PSR (8) and the retentate pressure in the end cavity (21). In addition, the permeate barrier has to be able to withstand the corresponding operating temperatures. The permeate barrier (19) therefore preferably consists of metal or plastic and is preferably fixed to the PSR (8) by screw connection or by flange or by means of barbs or by adhesive bonding. Corresponding technical solutions are easily discovered by the person skilled in the art. In the assembled permeate collecting tube (8), the overall permeate streams from the two cartridges are removed together.

The connection (18) between the permeate collecting tubes of the respective cartridges can be made in different ways. For instance, the rear and front ends of the permeate collecting tubes PSRE1 (26) and PSRE2 (27) can be executed as a flange connection or as a plug-in connection or as a screw connection. Alternative connection options, for example barb systems, are easily discovered by a person skilled in the art.

Analogously to the cartridge (2a), the cartridge (2b) has, at its rear end, a second VA2 (11) and preferably an EK2 (24). Through the retentate outlet orifices (12) in VA2 (11), the retentate from the second cartridge (2b) gets into the end cavity (21) of the module housing (3). The end cavity (21) is formed by the outer end face of VA2 (11) or the EK2 (24) of the second cartridge (2b) and the inner wall of the module housing (3) beyond the second cartridge. Because the second cartridge (2b), between its fluid inlet orifices (14) and its retentate outlet orifices (12), is also connected, at right angles to the longitudinal axis of the cartridge, in a fluid-tight manner to the inner wall of the module housing (3) by a seal (not shown in FIG. 1) and, in addition, because the PSR (8) has the permeate barrier (19), it is achieved that only the retentate obtained after several separation steps is present in the end cavity (21), which is discharged from the module housing (3) through the retentate outlet (7).

It is thus a feature of the module of the invention according to FIG. 1 that the fluid mixture originally to be separated is separated in two successive separation steps, first in cartridge (2a) and then in the second cartridge (2b). All the permeate streams are combined and conducted through the PSR to the permeate outlet (6) of the module present at the front cap (5) of the housing ((5) and (6) not shown in FIG. 1) and discharged from the module (1) therethrough. The front cap (5) is placed on after the module has been filled with the cartridges and is screwed to the housing (3) by means of the screw holes visible in FIG. 1. For the retentate too, only one outlet (7) in the module housing (3) is necessary. Since preferably all the cartridges have the same structure, the chain of cartridges, given a sufficiently long module housing (3), can be extended as desired, in that further cartridges of the invention are inserted between cartridge (2a) and cartridge (2b). A further advantage of the system of the invention is considered to be that the module housing (3) can remain permanently in the separation system and only consumed cartridges have to be exchanged. Cartridge exchange in turn is very simple and rapid, since the chain of cartridges as a whole can be removed from the housing. Thus, in the case of large systems having several hundred or thousand module housings, very short shutdown times are assured and maintenance costs are minimized.

As already mentioned, the cartridges of the invention comprise a permeate collecting tube PSR (8). This PSR has to be configured so as to be impervious to the fluid mixture to be separated in the interspace between VA1 (10) and VA2 (11) in the particular cartridge. Otherwise, as described above, the fluid mixture to be separated which is present in the interspace (9) would mix again with the permeate in the PSR (8). The PSR (8) preferably consists of a material which is mechanically stable and corrosion-resistant under the operating conditions of the cartridge, i.e. at operating pressure and operating temperature. It may preferably be manufactured from a metal or a plastic. Particular preference is given to steel, aluminium or plastic, and very particularly to stainless steel.

In the region of the EK1 cavity (15), the PSR (8), in contrast, has to be in fluid communication with the fluid in the EK1 cavity (15), so that the permeate can enter the PSR (8) at that point. Preferably, the PSR (8) therefore has orifices (16) in this region (see FIG. 3). With regard to the size, shape and number of the orifices, there are no particular restrictions, provided that sufficient fluid communication is assured.

Around the PSR (8) is disposed a multitude of hollow-fibre membranes to form a hollow-fibre bundle (28) (see FIG. 3). There are different options for arranging the hollow fibres. The hollow fibres may be arranged, for example, parallel to the longitudinal axis of the PSR (8), but they may also be wound around the PSR (8). With regard to the winding, there are again various options. Preferably, the hollow fibres, individually or a plurality simultaneously, are wound around the PSR (8). More preferably, the hollow fibres are wound helically around the PSR and most preferably cross over, in which case the helical lines of subsequent winding layers cross over, meaning that one layer is wound helically from the direction of VA1 (10) to VA2 (11), then the next from the direction of VA2 (11) to VA1 (10), and then alternation continues in this way. The preferred and particularly preferred winding methods have the advantage that the membranes can be packed homogeneously in the bundle (28) and hence a more homogeneous flow distribution is achieved compared to membrane alignment parallel to the PSR.

The bundle of hollow-fibre membranes preferably has a substantially circular cross section, more preferably having a diameter of 150-200 mm, even more preferably of 170-195 mm and most preferably of 180-190 mm.

For production of the membrane bundle (28), it is possible to use hollow-fibre membranes made from various materials, preferably polyether sulphone, polysulphone, polyetherimide, polyaramid, polyimide or polycarbonate, polyphenylene oxides, cellulose acetate, polyaryl ether ketone or polyether ether ketone. The choice of hollow-fibre membranes depends on the separation problem. The cartridges and modules of the invention can be used both for separation of liquids and gases and mixtures of liquids and gases. They are preferably used for separation of gases. According to the separation problem, various commercial membranes are available.

For the separation of gases, particular preference is given to hollow-fibre membranes made from polyimides, since these can be used at high temperatures and also have very good selectivity and permeance. Particular preference is given to polyimides which have been obtained by reaction of at least one dianhydride selected from the group consisting of 3,4,3',4'-benzophenonetetracarboxylic dianhydride, 1,2,4,5-benzenetetracarboxylic dianhydride, 3,4,3',4'-biphenyltetracarboxylic dianhydride, oxydiphthalic dianhydride, sulphonyldiphthalic dianhydride, 1,1,1,3,3,3-hexafluoro-2,2-propylidenediphthalic dianhydride and at least one diisocyanate selected from the group consisting of toluene 2,4-diisocyanate, toluene 2,6-diisocyanate, 4,4'-methylenediphenyl diisocyanate, 2,4,6-trimethyl-1,3-phenylene diisocyanate, 2,3,4,5-tetramethyl-1,4-phenylene diisocyanate.

These preferred polyimides have a high plasticization resistance. Very particular preference is given to polyimides comprising:

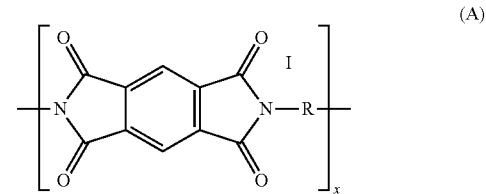

(A)

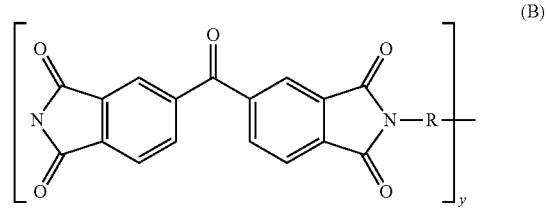

(B)

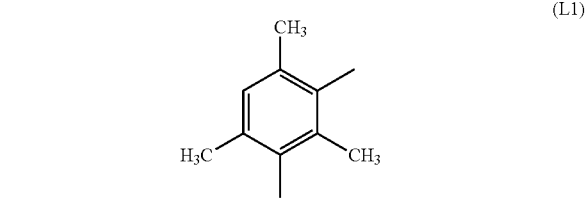

(L1)

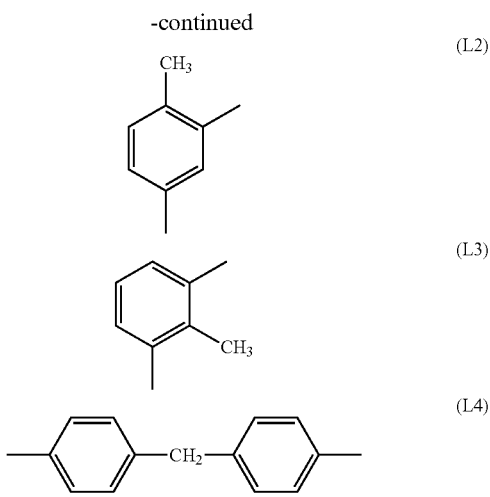

where 0≤x≤0.5 and 1≤y≤0.5 and R is one or more identical or different radicals selected from the group consisting of L1, L2, L3 and L4.

Most preferred are polymers with x=0, y=1 and R consisting of 64 mol % of L2, 16 mol % of L3 and 20 mol % of L4. This polymer is commercially available under the P84 or P84 type 70 name from Evonik Fibres GmbH and is registered under CAS number: 9046-51-9. A further particularly preferred polymer consists of x=0.4, y=0.6 and R=80 mol % of L2 and 20 mol % of L3. This polymer is commercially available as P84HT or P84 HT 325 from Evonik Fibres GmbH and is registered under CAS number: 134119-41-8.

The hollow-fibre membranes used in accordance with the invention preferably have a diameter of 150 to 500 μm and a length of 150 to 300 cm.

The membrane bundle (28) between VA1 (10) and VA2 (11) is surrounded on the outside by an impermeable barrier (13) (see FIG. 2). This barrier (13) preferably consists of a film or a hose or a tube or a tape or a glass fabric "blended" with epoxy resin. Particular preference is given to materials which fit close to the membrane bundle, especially shrinkable materials, for example polyolefins, PVC or polyimides. This minimizes interspaces between the barrier (13) and the outer surface of the membrane bundle (28). In this way, in turn, it is possible to prevent or at least minimize bypass flow of fluid mixture to be separated past the membrane bundle (28) into the retentate without being separated at a membrane.

For processing reasons, it may be appropriate to surround the fibre bundle, prior to the attachment of the barrier (13), with a suitable medium, for example a knitted nylon tube, in order to be able to apply the barrier (13) in a simpler manner and in order to keep the membrane bundle in shape.

In the impermeable barrier (13), fluid entry orifices (14) are present, or the impermeable barrier (13) does not extend over the entire distance between VA1 (10) and VA2 (11), so as to result in a gap as fluid entry orifice. The fluid entry orifices (14), based on the longitudinal axis of the cartridge, are disposed in the first third, preferably in the first quarter, of the distance between VA1 (10) and VA2 (11), more preferably at a distance of 0 to 10 cm beyond the inner end face (10b) of VA1 (10) and most preferably at a distance of 2 to 4 cm beyond the inner end face (10b) of VA1 (10). This prevents dead volumes and exploits the separation area of the membranes to the maximum.

The effect of this arrangement of the fluid entry orifices (14) and the arrangement of the retentate outlets (12) close to or within VA2 (11) is that the fluid mixture to be separated is moved past the outer walls of the hollow fibre membranes in the interspace (9) along the longitudinal axis of the cartridge, in the course of which the more slowly permeating fluid becomes enriched in the retentate. The impermeable barrier (13) in turn is important in order to prevent the enriched retentate from being mixed again with fresh fluid mixture to be separated.

The fluid entry orifices (14) may be configured, for example, in the form of holes or bores. Alternatively, it is possible to not execute the impermeable barrier over the entire length between VA1 (10) and VA2 (11). The effect of this is that a portion of the outer surface of the hollow-fibre bundle (28) is not surrounded by the impermeable barrier (13) over its entire extent. The result of this is to form not a "hole" (14) but an "entry gap" (14) surrounding the entire bundle. This gap must of course be within the above-described region between VA1 (10) and VA2 (11).

With regard to the number, shape and size of the fluid entry orifices and gaps (14), there are no particular restrictions. However, the orifices (14) should be sufficiently large to assure sufficient fluid flow and not be too large, in order to avoid the abovementioned backmixing of the enriched retentate with the fluid mixture to be separated.

In order to assure good binding of the impermeable barrier (13) to the cartridge, it may be advantageous to embed the material from which the barrier (13) is formed in VA1 (10) and/or VA2 (11). Alternatively or additionally, said material can also be fixed to the cartridge (2) by means of external fixing aids, for example wires or clamps, or by welding or by adhesive bonding or by shrinkage. Combinations of the measures mentioned are just as possible as alternative technical solutions that are easy for a person skilled in the art to find.

The hollow fibres, as stated, have been embedded in the tube sheet VA1 (10) at their front end HFE1. The tube sheet (10) may be produced by customary methods known to those skilled in the art and preferably consists of epoxy resin mixtures. The hollow fibres have been embedded in VA1 (10) in such a way that their cores are open, meaning that the permeate can exit the core of the hollow fibres and enter the EK1 cavity (15).

The tube sheet VA1 (10) may be produced by various methods, for example stationary potting or centrifuge potting. In the case of centrifuge potting, VA1 (10) is produced from casting resins in a centrifuge. The liquid resin is introduced into casting moulds at either end of the membrane bundle. The effect of the centrifuge is that the resin remains at the end of the fibre bundle; in addition, a very homogeneous and high-quality tube sheet is obtained. However, it is generally unable to prevent a proportion of the liquid resin from being sucked into the cores of the hollow-fibre membranes as a result of capillary forces and the latter thus being sealed. This problem is preferably solved by sealing the fibres with a high-temperature wax before they are potted. Preferably, this wax does not melt until about 160° C., such that it remains hard while the epoxy system reacts. In order to open the hollow-fibre cores again after the production of VA1 (10), a portion of the cured tube sheet VA1 (10) is cut off.

If this methodology is used for production of VA1 (10) of the cartridges (1) of the invention, one option is to execute the permeate collecting tube (8) in the form of at least two separate segments (29) and (30) (see FIG. 3); otherwise, the PSR (8) would be cut through when the "blocked" portion of VA1 (10) is cut off, or a complex cutting method would have to be employed for VA1 (10), in which the PSR (8) is not cut as well. It is therefore preferable when the PSR (8) of a cartridge (1) of the invention consists of at least two segments (29) and (30), in which case the first segment (29) extends from the front end PSRE1 (26) of the permeate collecting tube (8) at least into VA1 (10) and is connected there to the second segment of the PSR (30). The connection site (31) can be executed in the form of a plug-in connection or of a screw connection or by means of a bayonet connection or by adhesive bonding or in some other way.

The rear segment (30) extends from the connection site (31) as far as PSRE2 (27) and can be executed as a continuous segment or likewise be divided again into several segments.

If the PSR (8) is divided into two or more segments in a cartridge, the first front segment (29) preferably includes the orifices (16) described in detail above, through which the permeate can pass into the interior of the PSR (8) in the region of the EK1 cavity (15). In this case, the front segment (29) of the PSR is also referred to as permeate adapter.

The front end cap EK1 (23) of the cartridge of the invention preferably consists of a high-performance plastic, for example PA (6, 6,6, 12, etc.), PEEK, polyphenylene sulphite (PPS), polyphenylene ether/polystyrene mixtures (PPE/PS), or of metal, preferably stainless steel, and is preferably pulled over VA1 (10) after the curing of VA1 (10) and the opening of the cores of the hollow fibres. EK1 (23) is preferably held on VA1 (10) by the permeate adapter (29). EK1 (23) is configured in such a way that, after being mounted on VA1 (10), the EK1 cavity (15) is formed between the inner wall thereof and the outer end face (10*a*) of VA1 (10) that faces it (see FIG. 3). EK1 (23) can be bonded in a fixed manner to a segment (29) of the PSR (8), such that, when EK1 (23) is mounted on, the PSR segment (29) too is introduced simultaneously into the cartridge (1) as well. However, it is preferable that EK1 (23) has, in the middle of the end face thereof, a recess through which the front end of PSRE1 (26) is conducted, if the PSR (8) is executed as a tube, or, in the case of PSR (8) divided into segments, the PSR segment (29) can be introduced into the cartridge.

At the rear end of the membrane bundle (28) is the second tube sheet VA2 (11). On this side, there is no intention for permeate to exit the hollow-fibre cores. Therefore, the hollow fibres here are embedded into the casting resin, such that all the hollow-fibre cores are sealed at the rear end of the hollow-fibre bundle HFE2.

On the VA2 (11) side, the retentate has to be able to exit the cartridge. It is therefore preferable to provide retentate outlet orifices (12) embedded in VA2 (11), through which the retentate can exit. These orifices or channels (12) are preferably produced by using appropriately shaping casting moulds in the production of VA2 (11). As an alternative to embedding of the retentate outlets (12) in VA2 (11), it is also possible to produce retentate outlets (12), for example orifices in the impermeable barrier, in the last quarter of the distance between VA1 (10) and VA2 (11), preferably very close to the inner end face (11*a*) of VA2 (11) (not shown in FIGS. 1 to 3). Combinations of said measures are also possible. Preference is given to retentate outlet orifices (12) embedded in VA2 (11).

In any case, it is important to connect the cartridge (2) in a fluid-tight manner to the inner wall of the module housing (3) between the fluid inlet orifices (14) thereof and the retentate outlet orifices (12) thereof, for example by means of a seal mounted in this region.

The end cap EK2 (24) is preferably mounted on VA2 (11), or the end cap (24) is already used as casting mould for the production of VA2 (11) and remains in the cartridge. In principle, however, it is also possible to produce cartridges (2) without an end cap EK2 (24). In this case, it would be necessary to mount a seal between the outer surface of VA2 (11) and/or the impermeable barrier (13) and the inner surface of the module housing (3).

The embodiment with EK2 (11) is generally more stable and therefore preferable. The end cap EK2 (11) may consist of the same materials as EK1. For reasons of cost, it preferably consists of a high-performance plastic such as PA (6, 6,6 or 12), polyphenylene sulphite (PPS) or PEEK. Since it is unnecessary to cut VA2 (11) open to open the hollow-fibre cores, it may be advantageous when EK2 (24) is utilized directly as casting mould for production of VA2 (11). EK2 (24) must, as shown in FIG. 3, have retentate outlets (22) matched to the retentate outlets (12). Corresponding technical solutions are easily found by a person skilled in the art.

Analogously to EK1 (23), EK2 (24) is either bonded in a fixed manner to the PSR (8) or a segment (30) of the PSR or has, at its end face, an orifice through which the PSR (8) or the PSR segment (30) can be introduced.

EK2 (24) is configured in such a way that its outside concludes or can be bonded, at right angles to the axis of the cartridge, in a fluid-tight manner to the inner surface of the housing (3). This can preferably be effected in such a way that a seal (25) is mounted between the outer surface of EK2 (24) and the inner surface of the housing (3), preferably a rubber ring, flat seal, etc. In order to be able to fix the seal in the right position, EK2 (24) or the housing (3) may have suitable cavities, grooves, studs, etc.

As already mentioned, the ends PSRE1 (26) and PSRE2 (27) of two cartridges of the invention can be connected to one another by any desired means of connection, for example flange, screw connection, plug-in connection, bayonet connection, adhesive bonding, barb systems, etc., or combinations thereof. These ends may thus be configured in a variable manner according to the system.

The PSRE1 (26) of the foremost cartridge in the chain of cartridges is connected to the permeate outlet (6) of the module housing (3) or forms the latter. The fluid barrier (19) is installed into the PSRE2 (27) of the rearmost cartridge in the chain of cartridges or said PSRE2 (27) is closed with a closure cap.

The module housing (3) has to be executed so as to be pressure-resistant and generally consists of metal, preferably of steel, more preferably of carbon steel.

The modules and cartridges of the invention can be constructed and used in any desired size. The diameter of the cartridges is preferably in the range from 7 to 9 inches, preferably 7.5 to 8.5 inches, more preferably from 7.75 to 8.5 inches and most preferably from 8.0 to 8.25 inches. The length of the cartridges from PSRE1 (26) to PSRE2 (27) is preferably 0.5 to 2 m, more preferably 1 to 2 m, even more preferably 1.1 to 1.5 m and most preferably 1.3 to 1.4 m.

The modules and cartridges of the invention can be used at pressures in the range from 1 to 150 bar, preferably 30 to 120 bar and more preferably 40 to 100 bar. The operating temperatures are preferably −10 to 100° C. and more preferably 30 to 95° C.

The cartridges of the invention can preferably be produced by a process comprising the following steps:

Step a: A multitude of hollow-fibre membranes are disposed around a tube (8) to form a bundle (28).

Step b: An impermeable barrier composed of the abovementioned materials is produced around the arrangement from step a).

Step c:

The tube sheets VA1 (10) and VA2 (11) are produced at the front and rear ends HFE1 and HFE2 of the hollow-fibre bundle (28) by contacting the hollow fibres with a potting resin and then curing the resin, preferably in a centrifuge.

In the production of VA1 (10), preference is given to using a casting mould which is removed after the curing of VA1 (10) and is different from the end cap EK1 (23). Such casting moulds are known to those skilled in the art.

After the tube sheet VA1 (10) has been produced, if a production process in which the cores of the hollow-fibre membranes have been closed at the front end thereof is used, the latter is preferably cut through at right angles to the centre axis of the cartridge in step d) with a circular saw, a sharp blade or another suitable cutting device, in order to open the cores of the hollow fibres at HFE1.

Step d) should be conducted whenever it is not ensured by other measures that the cores of the hollow fibres remain open at HFE1 in the production of VA1 (10).

For production of VA2 (11), preference is given to using a casting mould configured in such a way that the permeate outlets (12) are produced within VA2 (11) when the resin is potted. The casting moulds used are generally different from the end cap EK2 (24). Since VA2 (11), however, need not be severed, it is also possible to use a suitable EK2 (24) directly as casting mould; this saves a working step.

The production of tube sheets in a centrifuge and the resins usable for the purpose are known prior art.

In step e), the end caps EK1 (23) and, as described above, optionally also EK2 (24) are placed onto the tube sheets, if the end caps have not already been used as casting mould in step c) as described above. If the above-described support elements (15a) and/or filter elements are used, these are attached as well in this process step. In addition, it may be advisable to attach additional seals, for example O-rings (see (32) in FIG. 3), between the end caps and the respective tube sheets. This too is preferably also effected in this step.

If a permeate collecting tube (8) consisting of various segments is used, it is preferable, after step e), to introduce the front segment (29) of the PSR through EK1 (23) and bond it to the second segment (30) in step f). Alternatively, the front segment (29) may also be part of EK1 (23) and may be placed on together therewith.

According to whether the impermeable barrier (13) is to be embedded into one or both of the tube sheets VA1 (10) and VA2 (11), step b) can be executed before or after step c). Preferably, step b) is executed before step c).

The impermeable barrier (13) in step b) can be produced by means of a material, preferably a film or a hose or a tube, which already has one or more fluid entry orifices (14) for the fluid mixture to be separated prior to the production of the impermeable barrier (13). Alternatively, it is possible to produce said fluid entry orifices (14) after the production of the impermeable barrier (13), preferably by drilling, punching or cutting corresponding holes, or by virtue of the material for production of the impermeable barrier (13) being disposed around the hollow-fibre bundle (28) in such a way that a section of the outer surface of the hollow-fibre bundle (28) between VA1 (10) and VA2 (11) is not covered, thus forming an annular fluid entry orifice (14) around the bundle (28).

If a film is used for production of the impermeable barrier (13), it is preferably wound around the bundle (28) and then bonded or welded along the longitudinal axis of the cartridge.

Preferably, however, the arrangement composed of PSR (8) and hollow-fibre membranes is introduced into a hose or tube which more preferably already has the fluid entry orifices (14). The hose or the tube is then secured to the cartridge by means of suitable holding devices, for example by winding wire around it or by means of grips or by bonding or by shrinkage or by embedding in VA1 (10) and/or VA2 (11). In the case of use of a hose or a film, it is particularly preferable to shrink the latter onto the membrane bundle (28) by heating.

According to the material used for the hollow fibres, it may be advisable to conduct further steps in the production operation for the cartridges. If this has not already preceded production of the membrane bundle, some polymers should be subjected to a heat treatment in order to improve the performance and/or stability of the membranes. Such a step can be effected at different points in the production operation, but preferably follows the production of the membrane bundle.

In addition, in the course of production of the membrane bundle, there may be fracturing or other damage to individual membranes. In such a case, it is preferable to repair the cartridges in order to assure the high performance of the cartridges. Methods for repairing such membrane bundles are known per se. For example, the cartridges can be pressurized with a low-pressure gas stream through the fluid entry orifices (14). As a result of the low pressure, the gas can only escape through damaged hollow-fibre membranes. These can be visualized with a liquid at the open ends of the hollow-fibre membranes (HFE1) and the damaged membrane can be sealed with resin.

The cartridges of the invention are preferably used in methods for separation of fluid mixtures of at least two fluids. It is a feature of this separation method that the fluid mixture to be separated, more preferably a gas mixture, is introduced into a cartridge (2) of the invention through at least one fluid entry orifice (14) under pressure, in such a way that there is a higher pressure on the outside of the hollow-fibre membranes than in the core of the fibre. The permeate is routed within the core of the hollow fibres to a cavity (15) between VA1 (10) and end cap EK1 (23) and routed onward at that point into the permeate collecting tube (8), through which it is ultimately discharged from the cartridge. The retentate which remains between the impermeable barrier (13) and the outer shell of the hollow fibres is routed in the direction of VA2 (11) and is discharged from the cartridge (2) through the exit orifices of the retentate (12).

The cartridges of the invention are preferably used for separation of $CO_2/CH_4$ (e.g. biogas, natural gas or shale gas processing), $H_2$ streams, for example syngas ratio adjustment, recovery of $H_2$ or He recovery from source gas.

The examples which follow serve to provide more particular elucidation and better understanding of the present invention, but do not limit it in any way.

EXAMPLE 1

First of all, hollow-fibre membranes were produced from P84HT according to Example 18 of WO 2011/009919 A1.

The hollow fibres were wound around a tube having an internal diameter of 43 mm and an external diameter of 51 mm and a length of 1750 mm, which later formed the second, i.e. rear, segment of the permeate collecting tube.

The first layer was wound helically from the front end of the tube to the rear end. At that point, the membrane was wound several times at an angle of 90° to the longitudinal tube axis and then the second layer was produced helically from the rear to the front end of the tube. Here too there were some windings at an angle of 90° to the longitudinal tube axis, followed by the third layer which was now wound helically again from the front to the rear end of the tube. Winding continued layer by layer in the manner described until a fibre bundle having a diameter, in the middle of the tube, of 190 mm had formed.

The hollow-fibre bundle was then heat-treated in an $N_2$ atmosphere at 315° C. for 60 min. After cooling, at both ends of the winding, the bundle was secured with a tape immediately in front of the sites with winding at an angle of 90°, and cut off in each case beyond the securing.

The arrangement composed of tube and hollow-fibre bundle thus obtained was pushed into a knitted nylon hose and then into a PVC shrinking hose, the length of which corresponded to the length of the shortened fibre bundle and which had fluid entry orifices in the first third of its length 8. The hose was shrunk onto the fibre bundle at 100° C. within 10 minutes.

The arrangement thus obtained was placed in a centrifuge and casting moulds were mounted at either end, each of which in turn was provided with an inlet for the casting resin. The casting mould at the rear end of the membrane bundle (VA2), i.e. at the opposite end of the fluid inlets in the shrink hose, had spikes which were inserted into the fibre bundle and which, in the later potting operation, formed the retentate exit orifices in the tube sheet VA2. The casting moulds were provided with a means of separation, in order to be able to part them from the respective tube sheet in a simpler manner after potting.

Before the permeate-side casting mould for VA1 was placed on, i.e. on the side on which the permeate was to exit the hollow-fibre cores at a later stage, the fibre ends were treated with a high-temperature wax in order to prevent excessively deep inward suction of the casting resin.

The amount of the casting resin was calculated such that each of the casting moulds was filled completely on either side.

With centrifugation, the two tube sheets were now formed at room temperature (<25° C.). The tube sheets were then subjected to further heat treatment at 100° C. for 4 hours and, after the tube sheets had been cooled down, the casting moulds were then removed. The tube sheet VA1 was cut through with a circular saw at a point at right angles to the centre axis of the cartridge and 5 mm beyond the respective end of the tube, as a result of which the hollow-fibre cores were opened on the permeate side. This produced the later permeate outlets in the EK1 end cap cavity.

The cartridge thus obtained with the hollow fibres open at VA1 was tested for defective membranes as explained in the general description, and defective or broken fibres were sealed with epoxy resin.

Thereafter, the two end caps EK1 and EK2 were mounted, and the rear end cap EK2 had retentate outlets which fitted the retentate exit orifices in VA2. The front end cap EK1 was designed and prepared such that, after it had been mounted on VA1, the EK1 cavity (see FIG. 3) was filled with a metal plate as support element (15a) and a sintered metal fabric disposed between the support element and the surface of VA1 facing it. The support element in turn was profiled on the side facing the sintered metal fabric, such that the permeate is routed through the channels in the profile from the cores of the hollow-fibre membranes to the permeate exit orifices in the front segment of the permeate collecting tube.

Through an orifice in the end face of the front end cap EK1, thereafter, the front segment of the permeate collecting tube was inserted and screw-connected to the tube already present within the cartridge within VA1 (see FIG. 3). Said front segment had, in the region of the EK cavity, bores (permeate exit orifices) through which, at a later stage, the permeate can flow out of the EK1 cavity into the permeate collecting tube (see FIG. 3).

EXAMPLE 2

A cartridge produced according to Example 1 was subjected to a separation and stress test in an appropriate test module housing.

For this purpose, in a cartridge produced according to Example 1, the rear end of the permeate collecting tube below VA2 was closed with a screw-in plug or blank plug, and hence the fluid barrier was established.

A seal with a U-shaped profile was pulled over the rear end cap EK2 of the cartridge, so as to form a gas-tight connection at that point with the inner wall of the module housing. Thereafter, the cartridge was inserted into the module housing and the housing was closed, with connection of the front end of the permeate collecting tube to the permeate outlet of the housing.

A gas mixture composed of 20.9% $O_2$ and 79.1% $N_2$ was then pumped through the fluid inlet of the module housing at 6.7 bara and 24° C.

A permeate having the following composition: 35.4% $O_2$ and 64.6% $N_2$ and a retentate having the following composition: 12.5% $O_2$ and 87.5% $N_2$ were obtained.

After the separation test, on the feed side of the cartridge, a pressure of 100 bar was applied three times, and the permeate side remained at atmospheric pressure. Thereafter, the separation test was repeated once more under the same conditions.

A permeate having the following composition: 35.3% $O_2$ and 64.7% $N_2$ and a retentate having the following composition: 12.5% $O_2$ and 87.5% $N_2$ were obtained.

The results of the separation test before and after the stress test at 100 bar prove that the cartridge of the invention can be used at high pressures and high gas volumes.

EXAMPLE 3

Three cartridges produced according to Example 1 were connected analogue to FIG. 3 within one module housing. The module was used to separate natural gas with a composition as shown in Table 1 below. The feed pressure was 62.2 BarA. Permeate pressure was 1.14 BarA. The feed flow was 826 Nm$^3$/hr. Table 1 shows the test results:

TABLE 1

|  | Feed Gas (after drying) | Product Gas | Permeate |
|---|---|---|---|
| N2 | 0.557% | 0.566% | 0.558% |
| CO2 | 4.248% | 1.874% | 29.782% |
| CH4 | 94.554% | 96.884% | 69.353% |
| C2H6 | 0.642% | 0.676% | 0.307% |
| Totals | 100.000% | 100.000% | 100.000% |

"%" in Table 1 means "% by volume". The observed $CO_2/CH_4$ selectivity of the module was 17.6 and the observed $CO_2$ permeance capacity was 4.0 $Nm^3$/hr/bar/module.

As can be seen in Table 1, the $CO_2$ content in the product stream could be reduced by around 55% compared to the feed stream while the $CH_4$ concentration in the product stream could be increased and the $C_2H_6$ content in the product stream kept constant. In view of the fact that only one module was used in this example, a $CO_2$ reduction of 55% is a very good result. Use of the modules in a 2-stage or 3-stage separation processes as for example the one disclosed in U.S. Pat. No. 8,999,038 leads to even higher product gas purities.

This example further shows that several cartridges can be connected successfully in a row in one module and that the modules can be used to separate multi component gas mixtures.

The module of this example was tested for 5 months without decrease in its performance.

LIST OF REFERENCE NUMERALS 1 separation module
2 cartridge
2a cartridge 1
2b cartridge 2
3 housing of separation module
4 fluid inlet of separation module
5 cap of module (not shown in FIG. 1)
6 permeate outlet of separation module (not shown in FIG. 1)
7 retentate outlet of separation module
8 permeate collecting tube
9 interspace between PSR (8), impermeable barrier (13) and the inner end faces (10b) and (11b) (see FIG. 3 in each case) of VA1 (10) and VA2 (11), in which the bundle of hollow-fibre membranes (28) (see FIG. 3, not shown in FIG. 1) and, in operation, the retentate are present front tube sheet VA1
10a outer end face of VA1
10b inner end face of VA1
11 rear tube sheet VA2
11a outer end face of VA2
11b inner end face of VA2
12 retentate outlet orifices in VA2
13 impermeable barrier
14 fluid entry orifice or gap of the cartridge
15 EK1 cavity between outer end face of VA1 (10a) and the inner surface of end cap EK1 (23)
15a support element
15b profile of support element
16 permeate exit orifices through which the PSR (8) is in fluid communication with the EK1 cavity (15)
17 gap between end cap EK1 (23) and the inner surface of the housing (3)
18 connection of the PSR of cartridge (2a) and cartridge (2b)
19 fluid barrier at the rear end of the PSR (8)
20 intervening cavity between cartridge (2a) and (2b) in the housing (3)
21 end cavity in the housing (3)
22 retentate outlet in EK2
23 front end cap EK1
24 rear end cap EK2
25 O-ring seal
26 front end of permeate collecting tube PSRE1
27 rear end of permeate collecting tube PSRE2
28 bundle of hollow-fibre membranes
29 front sub-segment of the permeate collecting tube (8) of a cartridge (permeate adapter)
30 rear sub-segment of the permeate collecting tube (8) of a cartridge
31 connection point between (29) and (30)
32 O-ring seal

What is claimed is:

1. A cartridge for separating a fluid mixture, comprising a permeate collecting tube PSR which consists of one or more segments and has a front end PSRE1 and a rear end PSRE2,
a multitude of hollow-fibre membranes arranged around the PSR and having a front end HFE1 on the PSRE1 side and a rear end HFE2 on the PSRE2 side,
a first tube sheet VA1 at HFE1 and PSRE1 and a second tube sheet VA2 at HFE2 and PSRE2,
a barrier which is impermeable to the fluid mixture to be separated and which surrounds the arrangement composed of PSR and hollow-fibre membranes in the region between VA1 and VA2,
a front end cap EK1 disposed above VA1,
optionally a rear end cap EK2 which, if present, is disposed above VA2,
wherein
the PSR or all the segments of the PSR in the region between VA1 and VA2 are configured so as to be impermeable to the fluid mixture to be separated,
the impermeable barrier comprising one or more fluid entry orifices into the interspace between the impermeable barrier and the PSR, the fluid entry orifices being present in the impermeable barrier or being formed by a gap resulting from the impermeable barrier not extending over the entire distance between VA1 and VA2, the fluid entry orifices being located in the first third of the distance between VA1 and VA2 with the distance being based on the longitudinal axis of the cartridge,
the HFE2 are embedded in VA2, with the cores of the hollow fibres closed at HFE2,
the HFE1 are embedded in VA1, with the cores of the hollow fibres open at HFE1,
the EK1 is configured and disposed above VA1 in such a way that a cavity is formed between the outer end face of VA1 where permeate flows out of the hollow-fibre cores and the inner surface of the end cap EK1,
permeate exit orifices are present in the PSR or in a segment of the PSR in the region of the cavity, such that there is fluid communication between fluid in the cavity and the interior of the PSR,
at least one exit orifice for retentate is present in the impermeable barrier in the last quarter of the distance between VA1 and VA2 or is embedded into VA2.

2. The cartridge of claim 1, wherein said fluid entry orifices into the interspace between the impermeable barrier and the PSR are located in the first quarter of the distance between VA1 and VA2.

3. The cartridge of claim 1, wherein said fluid entry orifices into the interspace between the impermeable barrier and the PSR are located at a distance of 2 to 4 cm beyond the inner end face of VA1.

4. The cartridge of claim 1, wherein the impermeable barrier consists of a film, a hose, a tube, a tape or a glass fabric "blended" with epoxy resin.

5. The cartridge of claim 4, wherein the impermeable barrier is fixed to the cartridge by shrinkage, by embedding into VA1, by embedding into VA2, by means of external fixing aids, by welding, by adhesive bonding or any combination thereof.

6. The cartridge of claim 1, wherein the PSR consists of several segments connected to one another within the cartridge by a screw connection, by a flange connection, by a plug-in connection, by means of a bayonet connection or by adhesive bonding.

7. The cartridge of claim 6, wherein the PSR consists of at least two segments, the first segment beginning at PSRE1 and extending at least into VA1 and being connected there to a second segment which, alone or in conjunction with further segments, forms the rest of the PSR as far as PSRE2, the first segment comprising the permeate exit orifices.

8. The cartridge of claim 1, wherein the hollow-fibre membranes are disposed in the form of bundles around the PSR, either parallel to the longitudinal axis of the PSR or wound around the PSR.

9. The cartridge of claim 8, wherein the bundles are helically wound around the PSR in such a way that the helical lines of each winding layer cross over, meaning that one layer has been wound helically from the direction of VA1 to VA2, and then the next from the direction of VA2 to VA1, and then alternation continues in this way.

10. The cartridge of claim 1, wherein the hollow-fibre membranes are disposed in the form of a bundle around the PSR and the bundle has a substantially circular cross section having a diameter of 150-200 mm.

11. The cartridge of claim 1, wherein the hollow-fibre membranes consist of polyimides obtainable by reaction of at least one dianhydride selected from the group consisting of 3,4,3',4'-benzophenonetetracarboxylic dianhydride, 1,2,4,5-benzenetetracarboxylic dianhydride, 3,4,3',4'-biphenyltetracarboxylic dianhydride, oxydiphthalic dianhydride, sulphonyldiphthalic dianhydride and 1,1,1,3,3,3-hexafluoro-2,2-propylidenediphthalic dianhydride, and at least one diisocyanate selected from the group consisting of toluene 2,4-diisocyanate, toluene 2,6-diisocyanate, 4,4'-methylenediphenyl diisocyanate, 2,4,6-trimethyl-1,3-phenylene diisocyanate and 2,3,5,6-tetramethyl-1,4-phenylene diisocyanate.

12. The cartridge of claim 1, wherein at least one support element manufactured from a porous material is present within the cavity.

13. The cartridge of claim 1, wherein at least one support element is present within the cavity, which has a profile routing fluid to the permeate exit orifices.

14. The cartridge of claim 13, wherein said support element is a profile comprising channels which is present on the side facing the VA1.

15. The cartridge of claim 1, wherein at least one filter element is present in the cavity.

16. The cartridge of claim 15, wherein the filter element is a woven or nonwoven fabric or a sintered metal plate.

17. The cartridge of claim 15, wherein the filter element is present in the cavity between a support element and VA1.

18. The cartridge of claim 1 for separating a gas mixture.

19. A fluid separation module, comprising one or more cartridges according to claim 1.

20. A fluid separation module, comprising
a pressure-resistant housing having a fluid inlet as well as a permeate outlet and a retentate outlet,
disposed in the pressure-resistant housing, a single cartridge according to claim 16 or a plurality of cartridges according to claim 16 connected to form a chain of cartridges, and
a connection of the permeate outlet of the pressure-resistant housing to the front end PSRE1 of the permeate collecting tube of the cartridge closest to the permeate outlet of the housing, wherein
each cartridge, in a region between the fluid entry orifice into the cartridge and the at least one exit orifice for the retentate of the cartridge, is connected to the inner wall of the pressure-resistant housing in an impervious manner,
the retentate outlet in the pressure-resistant housing is disposed downstream of the exit orifices for the retentate of the cartridge or, when a plurality of cartridges are connected to form a chain of cartridges, of the rearmost cartridge of the chain of cartridges, and
a fluid-tight closure of the PSR is disposed in the region of the PSRE2 of the cartridge or, when a plurality of cartridges are connected to form a chain of cartridges, of the PSRE2 of the rearmost cartridge of the chain of cartridges. A fluid separation module, comprising
a pressure-resistant housing having a fluid inlet as well as a permeate outlet and a retentate outlet,
disposed in the pressure-resistant housing, a single cartridge according to claim 16 or a plurality of cartridges according to claim 16 connected to form a chain of cartridges, and
a connection of the permeate outlet of the pressure-resistant housing to the front end PSRE1 of the permeate collecting tube of the cartridge closest to the permeate outlet of the housing,
wherein
each cartridge, in a region between the fluid entry orifice into the cartridge and the at least one exit orifice for the retentate of the cartridge, is connected to the inner wall of the pressure-resistant housing in an impervious manner,
the retentate outlet in the pressure-resistant housing is disposed downstream of the exit orifices for the retentate of the cartridge or, when a plurality of cartridges are connected to form a chain of cartridges, of the rearmost cartridge of the chain of cartridges, and
a fluid-tight closure of the PSR is disposed in the region of the PSRE2 of the cartridge or, when a plurality of cartridges are connected to form a chain of cartridges, of the PSRE2 of the rearmost cartridge of the chain of cartridges.

21. The fluid separation module of claim 20, wherein each cartridge is connected to the inner wall of the pressure-resistant housing by a sealing ring.

22. A method for separating a mixture composed of at least two fluids, wherein
the mixture to be separated is introduced under pressure into a cartridge according to claim 16 through at least one fluid entry orifice into the interspace between impermeable barrier and PSR, in such a way that there is a higher pressure on the outside of the hollow-fibre membranes than in the core of the hollow fibres,
the permeate in the core of the hollow fibres is routed onward to the end cap EK1, through the cavity into the permeate collecting tube and is discharged from the cartridge through the permeate collecting tube, and
the retentate, which remains between the impermeable barrier and the outside of the hollow fibres, is routed in the direction of VA2 and is discharged from the cartridge through the retentate outlet orifices.

23. The method of claim 22, wherein the fluid mixture to be separated is forced into the fluid entry orifices of the cartridge at a pressure of 1-150 bar.

24. The method of claim 22, wherein the fluid mixture to be separated is forced into the fluid entry orifices of the cartridge at a pressure of 40-100 bar.

25. The method of claim 22, wherein the fluid mixture is composed of at least two gases.

* * * * *